United States Patent [19]

de Groot et al.

[11] Patent Number: 5,381,174
[45] Date of Patent: Jan. 10, 1995

[54] METHOD OF AND ARRANGEMENT FOR CORRECTING VIGNETTING

[75] Inventors: Gert Jan de Groot, Unterägeri, Switzerland; Hans Hamering, Breda, Netherlands

[73] Assignee: U.S. Philips Corporation, New York, N.Y.

[21] Appl. No.: 958,411

[22] Filed: Oct. 8, 1992

[30] Foreign Application Priority Data

Oct. 25, 1991 [DE] Germany .................. 4135210

[51] Int. Cl.⁶ .................. H04N 5/30; H04N 5/14
[52] U.S. Cl. .................. 348/207; 348/335; 348/336; 348/571; 348/587; 348/590; 348/607
[58] Field of Search ............... 358/213.15, 213.27, 358/213.28, 160, 162, 166, 227, 228, 31, 40, 41, 42; H04N 9/04, 9/64; 348/607

[56] References Cited

U.S. PATENT DOCUMENTS 4,733,296 3/1988 Honbo et al. .................. 358/51
4,855,814 8/1989 Shiraishi et al. .................. 358/29

FOREIGN PATENT DOCUMENTS 62-51891 3/1987 Japan .................. H04N 9/04
62-86992 4/1987 Japan .................. H04N 9/04
63-276992 11/1988 Japan .................. H04N 9/097
1316084 12/1989 Japan .................. H04N 9/04
4213289 8/1992 Japan .................. H04N 9/04

Primary Examiner—Joseph Mancuso
Assistant Examiner—Bipin Shalwala
Attorney, Agent, or Firm—Edward W. Goodman

[57] ABSTRACT

For correcting vignetting in the upper or lower range of the pick-up area of optoelectric transducers of a multichannel color television camera with zoom lens are described, a representative signal is derived from the diaphragm aperture setting and from the zoom setting. Dependent on corresponding signals for the minimum diaphragm aperture, on the one hand, and the minimum values for wide-angle and telesetting of the zoom range, on the other hand, these representative signals generate control voltages with which the level of a field frequency sawtooth signal is controlled. Finally, this sawtooth-shaped control signal influences the video signal of each chrominance channel in the sense of a vignetting compensation.

11 Claims, 2 Drawing Sheets

METHOD OF AND ARRANGEMENT FOR CORRECTING VIGNETTING

BACKGROUND OF THE INVENTION

1. Field of the Invention

The invention relates to a method of correcting vignetting in the upper or lower range of the pick-up area of optoelectric transducers of a color television camera comprising a zoom lens, which vignetting is produced in dependence upon the zoom setting and when an objective-specific minimum diaphragm aperture value is exceeded, in which method a representative signal is derived from the diaphragm aperture setting and from the zoom setting.

2. Description of the Related Art

It is known that the optical input of a color television camera, i.e. both the camera lens, particularly the zoom lens at different diaphragm apertures, and the beam splitter produce different vignettings on the light-sensitive surface of each optoelectric transducer of a multichannel color television camera so that the image displayed on the display screen has a varying brightness, for example, it is brighter in the center than at the edges. These vignettings, which have approximately equal effects on each pick-up area, can be generally compensated for electronically by controlling the video signals with line and field-frequency sawtooth and parabolic voltages.

When a zoom lens is used, a further vignetting can be observed when the diaphragm aperture increases by a given value, for example from 2.8 to 1.4, dependent on the zoom setting, and the optoelectric transducers in the different chrominance channels are differently illuminated, both in wide-angle setting and in telesetting. In wide-angle setting the optoelectric transducers are illuminated in the upper area to a lesser extent than in the lower area due to the optical limitation of the exit pupil of the objective and the effect of the dichroic layers of the beam splitter at different angles of incidence of the light beam in the blue and red chrominance channels, whereas in the green chrominance channel the optoelectric transducer is illuminated in the upper area to a greater extent than in the lower area. In contrast, as from a given telesetting value, the optoelectric transducers are illuminated in the upper area to a greater extent than in the lower area due to the optical limitation of the entrance pupil of the objective and also in connection with the effect of the beam splitter in the blue and red chrominance channels, whereas the optoelectric transducer is illuminated conversely in the green channel. Consequently, when picking up a white scene as from an objective-specific diaphragm aperture and wide-angle setting, the upper area will be displayed greenish on the display screen of a color television monitor and the lower area will be displayed to a certain extent in magenta. In telesetting, these discolorations of the lower and upper areas of the display screen are reversed so that the upper area appears in magenta and the lower area appears greenish. The discolorations will be stronger as the diaphragm aperture is larger and as the zoom setting is more extreme.

SUMMARY OF THE INVENTION

It is therefore an object of the present invention to provide a method of the type described in the opening paragraph with which these discolorations can be certainly eliminated.

This object is achieved in a method of correcting vignetting in the upper or lower range of the pick-up area of optoelectric transducers of a color television camera as set forth in the opening paragraph, characterized in that, dependent on corresponding signals for the minimum diaphragm aperture and the minimum values for wide-angle setting and telesetting of the zoom range, said representative signals generate control voltages, in that said control voltages control the level of a field frequency sawtooth signal, and in that said sawtooth-shaped control signal influences the video signal of each chrominance channel in the sense of a vignetting compensation.

The method according to the invention has the advantage that a suitable compensation eliminating the discolorations is automatically realized for each zoom lens of a color television camera.

BRIEF DESCRIPTION OF THE DRAWINGS

These and other aspects of the invention will now be apparent from and elucidated with reference to the embodiments described hereinafter. In the drawing.

DESCRIPTION OF THE PREFERRED EMBODIMENT

Figure 1:
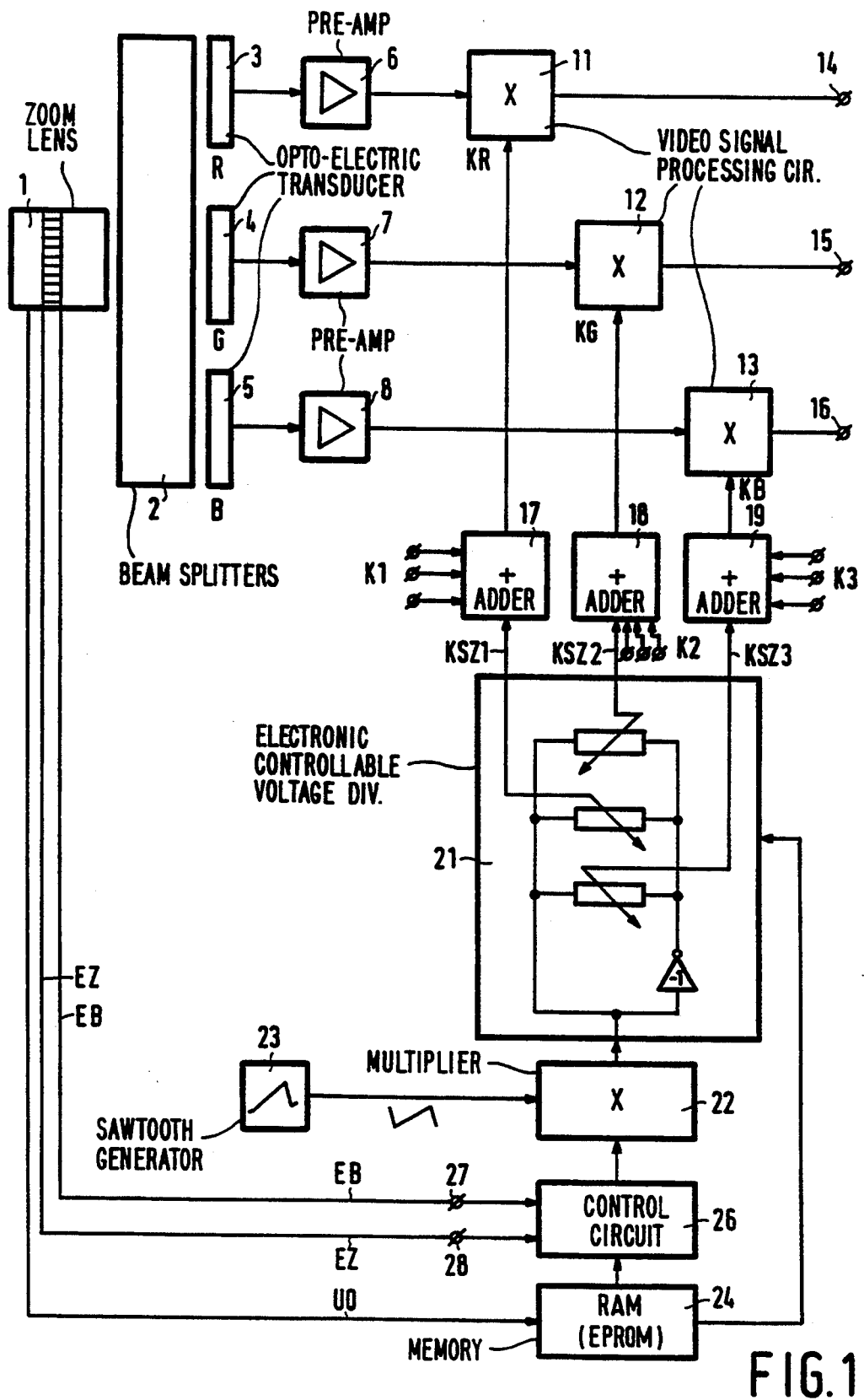
FIG. 1 is a block diagram of a color television camera including the parts which are essential for the invention.

FIG. 1 only shows those parts of a color television camera which are required to explain the invention. An image of the scene to be picked up is imaged on the optoelectric transducers 3, 4, 5, for example semiconductor sensors (CCD) for the chrominance channels red (R), green (G), blue (B) via an exchangeable zoom lens 1 and a beam splitter 2 having dichroic layers for color splitting. The video signal outputs of the optoelectric transducers 3, 4, 5 are connected to corresponding inputs of preamplifiers 6, 7, 8 in which the video signals are amplified. The video signal path to the preamplifiers 6, 7, 8 incorporates video signal processing circuits 11, 12, 13 in which the video signals are corrected and further amplified in known manner before they can be derived from the output terminals 14, 15, 16 and passed on or further processed.

Each video signal processing circuit 11, 12, 13 comprises a controllable amplifier whose degree of amplification can be changed by control signals KR, KG, KB at the control inputs. These control signals are generated in adder stages 17, 18, 19, respectively, in which different correction signals K1, K2, K3 caused, for example by different vignettings, are combined. Moreover, the adder stages 17, 18, 19 receive further sawtooth-shaped control signals KSZ1, KSZ2, KSZ3 generated by means of the method according to the invention from a circuit 21 operating as an electronically controllable voltage divider, for example a multiplying D/A converter. The sawtooth-shaped control signals KSZ are generated by means of a multiplier 22 which receives a field frequency sawtooth signal from a sawtooth generator 23 and a control voltage for controlling the field frequency sawtooth signal, which control voltage is dependent on the actual and stored objective data.

This control voltage is generated via a control circuit 26 in dependence upon the actual position values of zoom setting and diaphragm aperture of the zoom lens 1 and upon the objective-specific minimum diaphragm aperture and minimum zoom setting values stored in a memory 24 (RAM or EPROM). Details and operation of the control circuit 26 will be further described with reference to FIG. 2.

Dependent on the actual setting of the diaphragm aperture as well as on the zoom setting, setting signals EB and EZ, respectively, are applied to the control circuit 26. Moreover, the zoom lens 1 derives an identification signal UO for the memory 24 so as to read the relevant objective-specific data. Moreover, the memory 24 supplies a control signal (clock and data signal) for the circuit 21.

Figure 2:
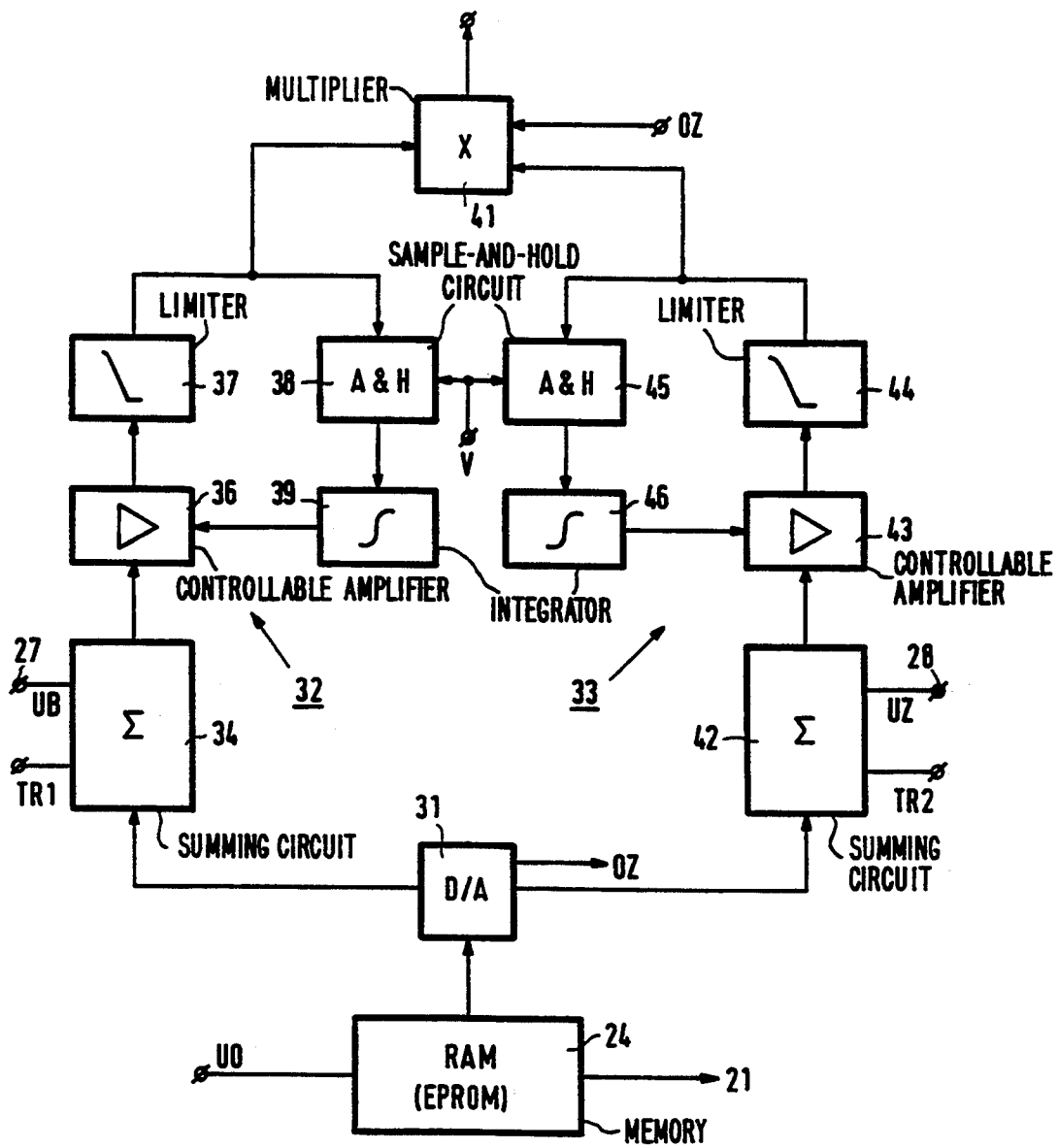
FIG. 2 is a block diagram of the circuit for vignetting correction according to the invention.

FIG. 2 shows the block diagram of the control circuit 26 in connection with the memory 24 of FIG. 1. As already stated, the objective-specific data for minimum diaphragm aperture and minimum zoom setting for "wide-angle" and "tele" can be read from the memory 24 in dependence upon the objective identification signal UO. These data signals are applied via a D/A converter 31 as an analog voltage of the minimum diaphragm aperture to the diaphragm control branch 32 and as an analog voltage of the minimum zoom setting for "wide-angle" and "tele" to the zoom control branch 33.

The first output of the D/A converter 31 is connected to an input of a summing circuit 34 whose further inputs convey (via terminal 27) the actual diaphragm signal EB and a reference clock signal TR1. This reference clock signal TR1 is a field frequency pulse signal having a pulse width of one line period. A DC signal with field frequency pulses generated in accordance with the actual diaphragm setting can be derived from the output of the summing circuit 34 above the minimum diaphragm aperture. This signal is applied to an amplifier control circuit comprising a controllable amplifier 36, a limiter 37, a sample-and-hold circuit 38 arranged in the feedback branch and controlled by the field frequency pulse signal, and an integrator circuit 39. The controllable amplifier 36 is adjusted by the feedback control voltage in such a way that a given voltage value, for example 1.5 Volt, is not exceeded so as to protect the subsequent multiplier 41 from overloading. The output signal of the diaphragm control branch 32 is applied to the first input of the multiplier.

The zoom control branch 33 includes a further summing circuit 42 whose first input is connected to the second output of the D/A converter 31, whose second input conveys the actual zoom signal EZ via terminal 28 and whose third input conveys a reference clock signal TR2. The reference clock signal TR2 is also a field frequency pulse signal having a pulse width of one line period. Above a given minimum wide-angle setting or a minimum telesetting, a DC signal, with field frequency pulses generated in accordance with the actual zoom setting, can then be derived from the output of the summing circuit 42. This signal is applied to an amplifier control circuit comprising a controllable amplifier 43, a limiter 44, a sample-and-hold circuit 45 arranged in the feedback branch and controlled by the field frequency pulse signal, and an integrator circuit 46. Also in this amplifier control circuit the controllable amplifier 43 is adjusted in such a way that a given voltage value is not exceeded. The output of the amplifier control circuit is connected to the second input of the multiplier 41. A third, inverting input of the multiplier 41 receives a zoom offset signal OZ for symmetry adjustment of the control voltage from the third output of the D/A converter 31. The control voltage for controlling the field frequency sawtooth signal in the multiplier 22 (FIG. 1) can subsequently be derived from the output of the multiplier 41.

Between a given minimum diaphragm aperture, for example, as from 2.8, and the complete diaphragm aperture, the first input of the multiplier 41 receives a direct voltage increasing in conformity with the diaphragm aperture in the case of wide-angle setting, while the second input receives a direct voltage from the limiter 44, which voltage is initially below the zoom offset voltage and is thus inoperative as a control voltage. Only at a given telesetting of the zoom lens will the direct voltage, which can be derived from the limiter 44, exceed the zoom offset voltage and thus effect a phase change of the sawtooth signal. The video signal processing circuits 11, 12, 13 can be controlled by means of this controlled field frequency sawtooth signal via the circuit 21 and the adder stages 17, 18, 19 in such a way that a video signal R, G, B without vignetting can be derived from the outputs 14, 15, 16, also at the extreme diaphragm aperture and an extreme zoom setting, both for wide-angle setting and for telesetting.

We claim:

1. A method of correcting vignetting in the upper or lower range of the pick-up area of opto-electric transducers of a multichannel color television camera comprising a zoom lens, said vignetting being produced when an objective-specific diaphragm aperture threshold value is exceeded and which is dependent on the zoom setting, said method comprising the steps:

deriving signals representative of a diaphragm aperture setting and a zoom setting of the zoom lens;

transforming said representative signals into a shaping signal, said transformation being dependent on the diaphragm aperture threshold value;

modulating a field frequency sawtooth signal with said shaping signal to obtain a shaped field frequency sawtooth signal; and correcting with said shaped field frequency sawtooth signal the gain of video signal processing circuits coupled to the respective opto-electrical transducers for a vignetting compensation.

2. A method as claimed in claim 1, wherein the shaping signal is inverted when the zoom setting changes from a wide-angle setting to a tele-photo setting, or conversely, and in which a zoom setting threshold value influences the zoom setting at which the shaping signal is inverted.

3. A method as claimed in claim 1, wherein said step of deriving signals representative of the diaphragm aperture threshold value and the zoom setting threshold value comprises:

addressing a memory, in which objective-specific data of different objectives is stored, with an objective identification signal corresponding to a relevant objective-specific data derived from the zoom lens; and reading from the memory the relevant objective-specific data.

4. A method as claimed in claim 1, wherein said step of transforming said representative signals into a shaping signal comprises:

deriving a first and a second signal from the signal representative of the diaphragm aperture setting and the signal representative of the zoom setting, respectively; and multiplying said first and second signals.

5. A method as claimed in claim 1, wherein said step of modulating the field frequency sawtooth signal comprises multiplying the field frequency sawtooth signal by said shaping signal to obtain said shaped field frequency sawtooth signal.

6. A method as claimed in claim 1, wherein said method further comprises the step of scaling said shaped field frequency signal individually for each of the video signal processing circuits whose gain is to be influenced.

7. A circuit for correcting vignetting in an upper or lower area range of a pick-up area of opto-electrical transducers of a multichannel color television camera comprising a zoom lens and video signal processing circuits coupled to the respective opto-electrical transducers, said video signal processing circuits having variable gains, said vignetting being produced when an objective-specific diaphragm aperture threshold value is exceeded and which is dependent on the zoom setting, said circuit comprising:

first means for deriving a first representative signal and a second representative signal from a diaphragm aperture setting and a zoom setting, respectively;

second means, coupled to said first means, for transforming said first and second representative signals into a shaping signal;

third means for generating a field frequency sawtooth signal;

fourth means, coupled to said second means and said third means, for modulating the field frequency sawtooth signal with said shaping signal to obtain a shaped field frequency sawtooth signal; and fifth means, coupled to said fourth means and said video signal processing circuits, for correcting with said shaped field frequency sawtooth signal, the gains of the video signal processing circuits.

8. A circuit as claimed in claim 7, wherein said second means comprises:

a first processing branch comprising a first summing stage having a first input for receiving said first representative signal, a second input for receiving a first auxiliary gain control signal, a third input for receiving a signal representative of a diaphragm aperture threshold value, and an output coupled to a first automatic amplifier control circuit having a gain which is dependent on a sampled first auxiliary gain control signal at an output of said first automatic amplifier control circuit;

a second processing branch comprising a second summing stage having a first input for receiving said second representative signal, a second input for receiving a second auxiliary gain control signal, a third input for receiving a signal representative of a zoom setting threshold value, and an output coupled to a second automatic amplifier control circuit having a gain which is dependent on a sampled second auxiliary gain control signal at an output of said second automatic amplifier control circuit; and a multiplier circuit having a first input coupled to the output of the first automatic amplifier control circuit, a second input coupled to the output of the second automatic amplifier control circuit, and a third input for receiving a zoom offset signal for subtraction from the signal at said second input prior to multiplication, an output of said multiplier circuit forming an output of said second means.

9. A circuit as claimed in claim 8, wherein a memory arrangement is provided in which the objective-specific data, particularly the diaphragm aperture threshold value and the zoom setting threshold value of television camera zoom lenses are stored, and in that the output of the memory is coupled via a D/A converter to the third inputs of the summing stages in the first and second processing branches, and to the third input of the multiplier.

10. A circuit as claimed in claim 9, characterized in that the memory for the objective data is a random-access memory (RAM).

11. A circuit as claimed in claim 9, characterized in that an objective memory arrangement is provided for each zoom lens, which arrangement is also exchangeable when the zoom lens is changed.

* * * * *